United States Patent [19]

Shrontz et al.

[11] Patent Number: 5,165,699
[45] Date of Patent: Nov. 24, 1992

[54] LIQUID FULL PRESSURIZED VESSEL SEAL

[75] Inventors: Charles D. Shrontz, Lisbon, Ohio; Jerry L. Carnes, Midland, Pa.

[73] Assignee: Arco Chemical Technology, L.P., Wilmington, Del.

[21] Appl. No.: 735,965

[22] Filed: Jul. 25, 1991

[51] Int. Cl.⁵ .................. F16J 15/32; F16J 15/40; F16J 15/44

[52] U.S. Cl. .......................... 277/1; 277/3; 277/59; 277/65; 277/71; 277/74; 277/79; 277/134; 277/135

[58] Field of Search ............ 277/1, 3, 15, 59, 63, 277/65, 71, 72 R, 74, 79, 133, 134, 135

[56] References Cited

U.S. PATENT DOCUMENTS

| | | |
|---|---|---|
| 1,552,666 | 9/1925 | Banbury . |
| 3,468,548 | 9/1969 | Webb . |
| 3,697,088 | 10/1972 | Hummer . |
| 3,700,247 | 10/1972 | Butler et al. . |
| 3,810,637 | 5/1974 | Bonvin .................. 277/96.2 |
| 3,912,284 | 10/1975 | Gosling et al. ........... 277/59 X |
| 3,934,311 | 1/1976 | Thompson .............. 277/59 X |
| 3,940,150 | 2/1976 | Martin et al. . |
| 3,963,247 | 6/1976 | Nommensen . |
| 4,010,960 | 3/1977 | Martin . |
| 4,063,743 | 12/1977 | Petros ................... 277/135 X |
| 4,386,786 | 6/1983 | Agrama ................. 277/170 X |
| 4,431,199 | 2/1984 | Iwane ....................... 277/3 |
| 4,476,772 | 10/1984 | Gorman et al. . |
| 4,534,569 | 8/1985 | Ishitani et al. .............. 277/59 X |
| 4,545,588 | 10/1955 | Nagai et al. . |
| 4,629,196 | 12/1986 | Joniec ...................... 277/15 X |
| 4,648,605 | 3/1987 | Marsi . |

FOREIGN PATENT DOCUMENTS

| | | | |
|---|---|---|---|
| 1476880 | 4/1967 | France ................. 277/71 |
| 579454 | 7/1958 | Italy .................. 277/65 |
| 611154 | 10/1960 | Italy .................. 277/71 |
| 120354 | 9/1979 | Japan ................. 277/59 |
| 383710 | 10/1964 | Switzerland ........... 277/65 |
| 324763 | 2/1930 | United Kingdom ....... 277/134 |

Primary Examiner—William A. Cuchlinski, Jr.
Assistant Examiner—Scott W. Cummings
Attorney, Agent, or Firm—David L. Mossman; Stephen D. Harper

[57] ABSTRACT

A liquid full pressurized vessel seal is provided to effectively seal around rotating shafts in the walls of vessels that stir, for example, highly viscous materials such as polymers. The seal has a housing with a conventional mechanical seal and a bushing on the outward side thereof, after which is injected a sealing liquid under pressure such as mineral oil. The pressure of the sealing liquid is sufficient to just force open a plurality of lip seals facing the direction of the vessel. The mineral oil, or other fluid compatible with the contents of the vessel, meets the product in a wind back pump section of the seal having a thread that forces the product back into the vessel and thus prevents its leakage.

24 Claims, 2 Drawing Sheets

LIQUID FULL PRESSURIZED VESSEL SEAL

FIELD OF THE INVENTION

The invention relates to mechanical seals for vessels, and in one aspect more particularly relates to mechanical/liquid seals around rotating shafts for vessels where the vessel contains viscous liquids under pressure.

BACKGROUND OF THE INVENTION

A number of mechanical seals for vessels are known including seals around rotating shafts that pierce the walls of the vessels. The primary purpose of such seals is to prevent the contents of the vessels from leaking out the entry point of the shaft. However, due to the wide variety of liquids commonly processed, seals suitable for one application are not necessarily suitable for other uses.

An area of particular concern are mechanical seals for vessels that contain relatively large portions of very viscous liquids, such as a viscous liquid polymers. Such materials tend to subject the seals and the shafts therein which may drive a mixing blade or the like, to hydraulic shock during processing. Seals for such vessels are known, but these seals are also known to have relatively limited life spans, of only a few months, before the process line must be shutdown to replace the seals for excessive leaking due to seal deterioration.

A number of patents are known describing various vessel seals, but not all are suitable to seal around a rotatable shaft such as for a mixing blade for vessels containing very viscous materials. Such patents include U.S. Pat. No. 4,010,960 which discusses a rotating seal, sealing by viscous effect, installed on a rotating shaft crossing through a bore separating, from the outside medium, an enclosure containing a fluid kept under pressure. The seal has at its center two threads having an unequal length and having reverse pitches, separated by a groove and a lip seal for each around a rotating shaft of the conventional type on either side of the threads. A gap between the lip seals is fed with a viscous fluid by two tanks, one of which is at the pressure of the fluid for which sealing is to be provided. This device is said to have application to shafts rotating at a high speed for all types of enclosures containing a gas or a liquid under pressure which can reach several tens of bars.

A visco-type seal wherein a sealing pressure is built up in a fluid by means of one or more helical windings, the fluid being enclosed in a narrow clearance between a stator and a rotor is described in U.S. Pat. No. 3,963,247. The alignment of the rotor within the stator is insured by providing a thin layer of material at the outer ends of at least one of the helical windings so that the clearance in a radial direction between the stator and the rotor at this location is less than the clearance existing in a radial direction between the helical windings and the stator. In one embodiment, the stator is designed as a sleeve which has a flexible connection in the radial direction with respect to a wall. The stator or a sealing element fastened thereto is movable in an axial direction by means of a resilient force to obtain a proper sealing when the device is at rest.

Also of interest is U.S. Pat. No. 3,700,247 which mentions certain shaft seals using a viscoseal-type sealing screw such as those adjacent the pressurized screw pump section of a viscous liquid devolatilizer. Excessive heat buildup and/or prolonged elevated temperature exposure in the seal region can either deteriorate the liquid materials in the sealing screw or render such liquids less viscous to an extent such that the seal is no longer fully operative. To cool and flush the sealing screw and the liquid materials therein, a fluid conduit bringing fresh liquid material continuously to the sealing screw from the adjacent pressurized section is provided.

A number of seals use a reverse thread to pump the liquid away from the seal, as mentioned. For example, a packing for a rotor shaft opening through the casing of a machine for treating plastic materials is described in U.S. Pat. No. 1,552,668. The packing comprises in combination with the rotor shaft, three metal rings surrounding the shaft and arranged face to face. The inner of the rings has an opening larger in diameter than the shaft and is fixed against rotary, transverse and longitudinal movements relative to the shaft. The outer of the rings has an opening larger in diameter than the shaft and is fixed against rotary and transverse movements, but is capable of longitudinal movements relative to the shaft. The intermediate of the rings is closely fitted to and keyed to the shaft, the ring being capable of rotation with and movements transversely with the shaft between the inner and outer rings. A mechanism for forcing the rings into close contact is also present as are spiral grooves along the shaft to bring material back into the chamber.

U.S. Pat. No. 3,468,548 mentions a liquid-vapor interface type of seal for the rotating shaft of a turbine utilizing mercury as the working fluid. The seal includes three pumps extending between the shaft and the housing from the high-pressure turbine cavity to a low-pressure vented area. The pumps are adapted to pump liquid or vapor upon rotation of the shaft. First pump comprises a helical groove extending from the cavity to a slinger pump housed in a slinger space. The first pump is adapted to pump mercury vapor from the cavity toward the slinger space. The slinger pump tends to pump in the opposite direction of the first pump. The mercury vapor in the first pump and the slinger space is cooled and condensed to a liquid by flowing coolant liquid through a passage in the housing or by injecting cooled mercury into the seal. A liquid-vapor interface is formed in the slinger space and leakage of mercury vapor toward the vent is further restricted by means of a molecular pump in the form of a second helical groove extending from the vent to the slinger space and is adapted on rotation of the shaft to pump mercury molecules toward the interface.

A partly melting rotating seal assembly surrounding a rotating shaft crossing through a wall limiting a volume of fluid kept under pressure, constituted by a solidified sleeve of the fluid to be sealed or of an intermediate fluid, contained in an external metallic sleeve integral with the wall and provided with a cooling mechanism is disclosed in U.S. Pat. No. 3,940,150. A very thin thread, integral with the shaft, maintains during the rotation of the shaft, a thin liquid film between the shaft and the solidified sleeve, ensuring sealing along the shaft.

A mechanical seal for sealing a slurry liquid between a casing and a rotary shaft is described in U.S. Pat. No. 4,545,588. The seal comprises a fixed seat ring; a rotatable slide ring in the casing and abutting against the seat ring to form a sealing face therebetween; a helical spring in the casing and surrounding the rotary shaft, and biasing the rotatable slide ring toward the seat ring; and a rotatable ring on the rotary shaft and rotatable with the rotary shaft and holding the spring at a predetermined position relative to the rotary shaft, the spring being interposed between the rotatable slide ring and the rotatable ring. A small space is provided between the casing and the rotatable ring and the rotatable ring has a helical projection on the outer surface thereof. The helical projection of the rotatable ring and the helical spring are directed such that upon rotation thereof a force is produced in a direction away from the sealing face and toward the interior of the casing. The spring is a helical screw-thread-like member of rectangular cross-section.

Somewhat less relevent patents include U.S. Pat. No. 3,697,088 which discusses a mechanical seal construction for use between a wall and a shaft extending therethrough and rotatable relative to the wall. The seal construction includes a conventional mechanical seal assembly having a pair of seal members with mutually contacting seal faces thereon, one seal member being fixed with respect to the wall and the other seal member being capable of rotation with the shaft. A floatable bushing assembly is disposed adjacent the mechanical seal assembly and includes an annular bushing member surrounding the shaft and floatable relative to a surrounding stationary housing member. The bushing member is resiliently urged against the housing member to sealingly engage the same. A small radial clearance is provided between the bushing member and the shaft to permit relative rotation therebetween whereas the bushing is free to radially float in response to deflection or whip of the shaft. The floating bushing assembly is disposed outwardly from the mechanical seal assembly to act as a safety or back-up for preventing large quantities of fluid from suddenly escaping in the event of a failure of the mechanical seal assembly.

An improvement in a sealing combination for sealing intermediate a cap ring on the hydraulic cylinder or the like and a rod running concentrically therethrough is described in U.S. Pat. No. 4,476,772. The combination has in addition to the usual cage assembly on the cylinder assembly, a stuffing box and a wiper ring box for holding respective seals and ring wiper, bearing for maintaining the rod centralized within the central assembly and facilitating longitudinal movement. Also present is a primary seal disposed about the rod and within the sealing box, a rod wiper disposed about the rod and within the wiper ring box, secondary seal disposed about the rod and intermediate the primary seal and the rod wiper and a stop device disposed intermediate the primary seal and the secondary seal and adapted to stop longitudinal movement of the bearing to prevent crushing the second seal.

Finally, U.S. Pat. No. 4,648,605 discusses a mechanical seal assembly especially adaptable for use in the chemical industry in which a jacket impervious to the chemical involved surrounds a spring means which urges the seal faces toward one another. The spring is capable of transmitting torque and provides axial support to the jacket.

Despite these devices, there remains a need for a mechanical seal for rotating shafts on vessels which contain viscous liquids such as polymers with increased durability. Conventionally available seals often last only about four months. Study of the aforementioned patents will reveal that many are of complex design having numerous elements within the seal contact areas which are more likely to contribute to diminished, rather than increased durability.

SUMMARY OF THE INVENTION

Accordingly, it is an object of the present invention to provide a liquid full pressurized vessel seal suitable for use on vessels containing highly viscous materials.

It is another object of the present invention to provide a liquid vessel seal having prolonged durability.

Still another object of the present invention is to provide a combination mechanical and liquid seal for vessels containing viscous liquids which is of relatively simple construction.

In carrying out these and other objects of the invention, there is provided, in one form, a liquid full pressurized vessel seal associated with a rotatable shaft and a stationary housing having a bore surrounding the shaft where the housing is integral with a vessel defining an interior space. The seal has a stationary bushing within the bore within which the rotatable shaft may turn and a mechanism for injecting a sealing fluid under pressure through the housing and the bushing onto the shaft at at least one injection point. Also present are a sealing surface on the rotatable shaft located inward from the injection point toward the vessel, and a plurality of lip seals on the bore inward from the injection point toward the vessel, the lip seals being adjacent to and contacting the sealing surface.

It will be appreciated that some features of the invention, particularly the spacing between elements has been exaggerated out of proportion in the Figures so that the invention may be clearly illustrated.

DETAILED DESCRIPTION OF THE INVENTION

It has been discovered that a full liquid pressurized liquid seal may be used in conjunction with a double mechanical seal to provide an improved overall seal for rotating shafts piercing the walls of vessels containing highly viscous materials such as polymers, for example styrenic resins such as styrene-maleic anhydride (SMA), styrene-acrylonitrile and the like as examples only. By liquid full pressurized seal is meant the vessel is completely full and is hydrostatic, having no head space of compressible gas to help dampen shocks. In one embodiment, the seal consists of two lip seals running on a ceramic coated sleeve and a wind back section closely fitted to a Teflon ® tetrafluoroethylene sleeve or bushing. The wind back section provides a pumping action to continuously flush material away from the lip seals and the mechanical seal.

In general, the viscous liquids within the vessel are expected to be very viscous, high molecular weight materials. The pressures such materials are expected to be under may be equal to or greater than about 150 psi.

A sealing fluid is injected into the seal at the bushing to provide a hydraulic force against the product under pressure. The fluid pressure of the injected sealing liquid must be greater than the vessel operating pressure to allow a metered amount of the compatible fluid to force the lip seals open and pass into the wind back seal area. This small amount of fluid then mixes with the process fluid and is "wound back" or pumped into the vessel.

The lip seals must be run in full contact with the ceramic coated sleeve to prevent any migration of the process fluid, e.g. polymer, if the shaft is not rotating, which would make the wind back pump non-functional. In order to prevent damage to the lip seals from excessive radial shaft movement, a bushing is placed in the housing bore directly above the lip seals. The bushing to shaft clearance is less than the maximum allowable runout of the lip seal. That is, the purpose of the bushing is to restrict the radial whip or oscillation of the shaft. In one representative, but non-limiting example, suppose the lip seals can only handle 0.020 inch deflection without permanent damage. The bushing to shaft clearance would limit the shaft deflection to 0.010 inch, well within the limits of the lip seals.

An experimental version of the liquid full pressurized vessel seal has been operating considerably longer than conventional seals in the same machinery. The longest the conventional seals have lasted in this application has been four months.

Figure 1:
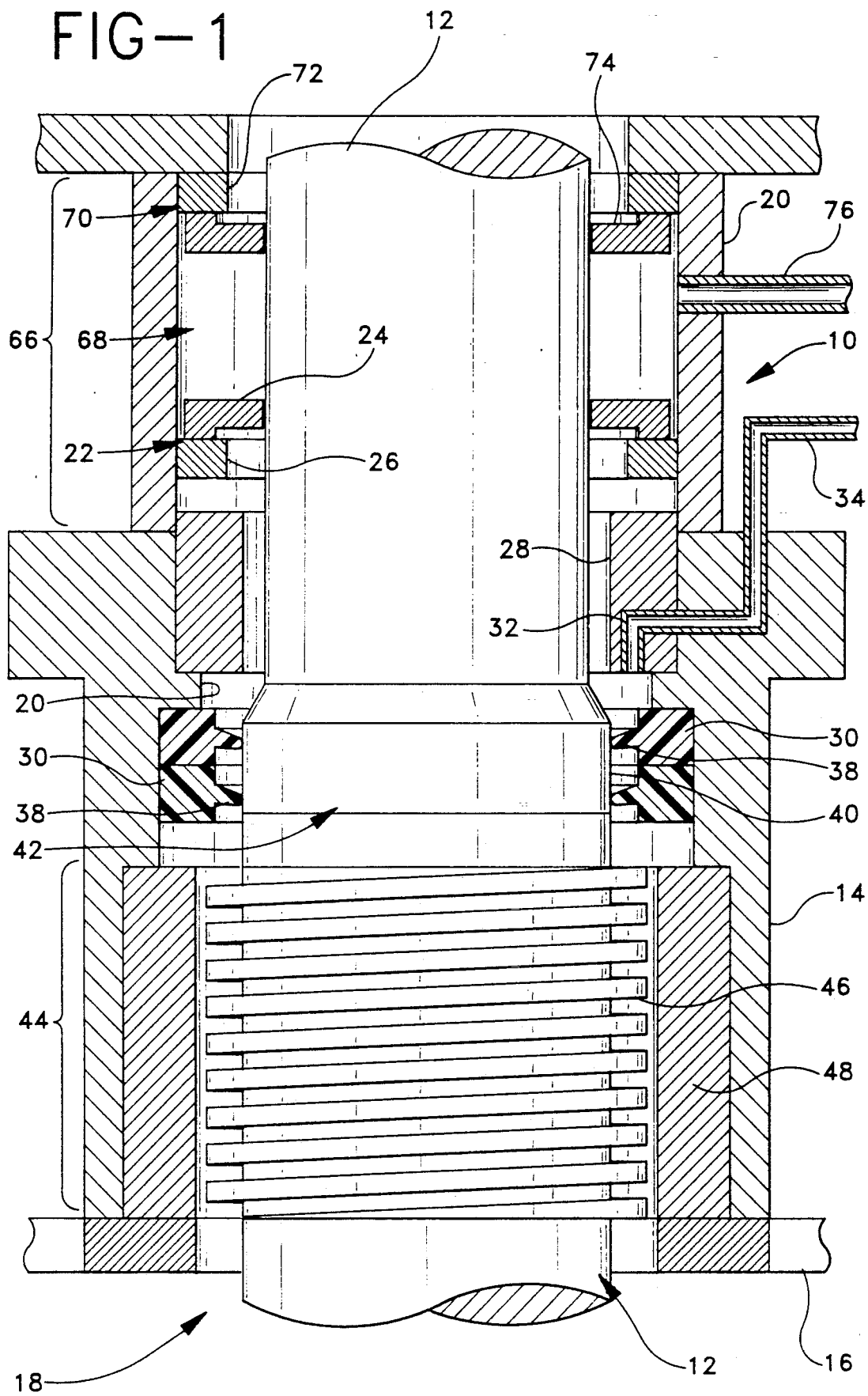
FIG. 1 is a cross-sectional illustration of one embodiment of the liquid full pressurized vessel seal of this invention.

Looking at the invention in more detail and relative to the drawings, there is seen in FIG. 1 a liquid full pressurized vessel seal referred to as a whole at 10, which involves a rotatable shaft 12 within a stationary housing 14 affixed to a vessel wall 16 defining an interior space 18. Outward is defined as away from the vessel interior 18 and thus, inward refers to a direction toward the vessel. The housing 14 has a bore 20 within which rotatable shaft 12 turns. A conventional mechanical seal 22 comprising a rotor 24 and a stator 26 is placed most outward on the seal 10. This seal 22 may be of any conventional material. For example, the rotating face or rotor 24 may be carbon, while the stationary face or stator 26 may be ceramic, tungsten carbide, silicon carbide, hardened stainless, or other suitably hard material. A bushing 28 within bore 20 is stationary relative to the bore 20 and is provided to restrict the radial motion of the shaft 12 which may damage the plurality of lip seals 30 further inward around shaft 12, as discussed above. This seal may be subject to repeated and strong hydraulic shocks and it must be designed to withstand these shocks. The hydraulic shocks result from positive displacement pumps transferring material into and out of the vessel. They may also result from temperature changes within part or all of the system that causes a differential in the expansion rates of adjacent materials. The bushing 28 may be made out of any suitable material, including, but not limited to brass, bronze, cast iron or the like.

A mechanism is provided for injecting a sealing fluid under pressure through the housing 14 and bushing 28 onto the shaft at at least one injection point 32. This sealing fluid injection may be accomplished by injection conduit 34 schematically illustrated. The sealing fluid may include any suitable fluid that is compatible with the product being processed in the vessel interior 18. Since the sealing fluid will mix therewith, the fluid must not adversely react therewith or cause problems in the product downstream. It must be remembered that only very small quantities of sealing fluid will enter the product mix. Some suitable sealing fluids for use with polymers include, but are not necessarily limited to, mineral oil, silicone oil, the polymer contained in the vessel itself, a compatible monomer or any other compatible material.

The sealing fluid 36 (see FIG. 2) is under pressure, and should be under sufficient pressure to enable a metered amount to force the lip seals 30 open and move inward to the vessel interior 18. This pressure will, of course, vary with a number of factors, including, but not limited to, the viscosity of the material and the speed of the rotating shaft 12. In one embodiment, and given as an example only, the sealing fluid pressure while the shaft 12 was rotating was 15 psi. The amount of fluid 36 injected is metered by pump 50.

The housing 12 bore 20 also possesses a plurality of lip seals 30, at least two, that are stationary relative to the housing 12. While only one lip seal 30 may be effective in some applications, two are preferred for back-up purposes. The lip seals 30 has a thin ring lip 38. In one embodiment, thin ring lip 38 is angled toward the vessel. This angle helps the sealing fluid 36 squeeze by lip 38, and also is a back-up mechanism to help prevent product from passing through the lip seals in the other direction. Lip seals 30 may be made from any suitable material, including, but not limited to that designated as SP1 ® by Garlock, Inc.

Lip seals 30 must engage the rotatable shaft 12 at a sealing surface 40 adjacent thereto. Thin ring lips 38 must contact shaft 12 completely, except where sealing liquid 36 is forced through. In one embodiment, the sealing surface 40 preferably has a ceramic coating 42 thereon. It has been surprisingly discovered that the combination of the ceramic coating 42 with the lip seals 30 forms an excellent seal for the purposes of this invention. The ceramic coating may include, but is not limited to such materials as chromium oxide, alumina, fused silica, and any hard surface to resist wear from the lips 38 of lip seals 30. Chromium oxide has been used as one particular coating 42 on the sealing surface 40 to advantage.

Also present in the liquid full pressure vessel seal 10 in some embodiments is a wind back pump section 44 designed to pump back the product into the vessel by hydraulic action. Pump 44 has a single thread 46 angled so as to push product back into the vessel. It will be appreciated that the direction of the thread 46 will depend upon the direction of rotation of the shaft 12. This wind back section 44 also has present a stationary bushing 48 in the bore 20 of housing 14 having an inner diameter in close proximity to the outer edges of thread 46. Thread 46 should not touch bushing 48, but should be in close tolerance thereto. Bushing 48 is fabricated from any suitable material, and in one embodiment, is made of polytetrafluoroethylene (sold as Teflon ® material) to prevent sticking and ease of transmission of the product back into the vessel. It may also be made of the same material as bushing 28. It is expected in operation of the device as the shaft 12 is rotating, that the interface between the sealing fluid 36 and the product will be within the wind back pump section 44, and this is preferable.

Figure 2:
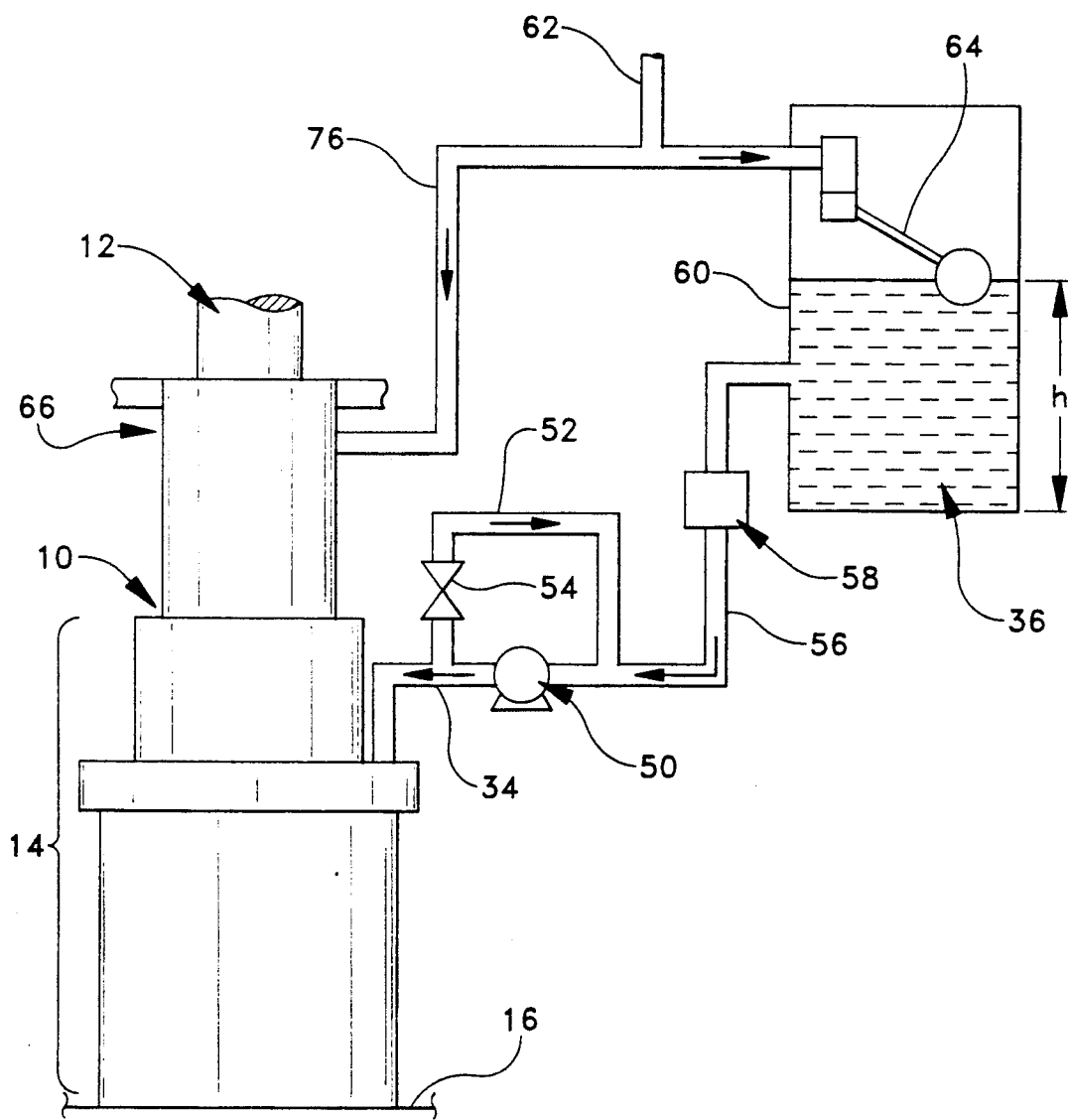
FIG. 2 is a schematic illustration of the liquid full pressurized vessel seal of this invention showing how the seal works in conjunction with its sealing oil supply system.

Turning to FIG. 2, liquid full pressurized seal 10 is shown in relation to the rest of the sealing liquid 36 supply system that ends at conduit 34 which comes from the outlet end of a pump 50. One pump 50 that has been found suitable is Wilson ® Air Driven Metering Pump Model No. CP125W125B316V although it will be appreciated that others will be suitable. Relief bypass line 52 provides recycle through relief valve 54 as needed in response to the requirements of seal 10. Pump 50 should keep line 34 at a fairly constant pressure, and the amount of sealing liquid 36 passed through lip seals 30 is determined by the design of seal 10 and the shaft 12's operating speed. However, it is anticipated that adjustments in the back pressure against the product may be made by adjustments to pump 50 in some cases as well as to valve 54.

Sealing fluid 36 to the inlet side of pump 50 comes from tank line 56 through filter 58 that is connected to the outlet of storage tank 60. Storage tank 60 is filled on demand from main seal pressure supply line 62 by float valve 64 calibrated to a preset level. The sealing fluid supply system is provided by conventional components to provide a steady stream of sealing fluid 36 under pressure to seal 10.

In operation, sealing fluid 36 is supplied at a pressure to counter the static pressure of the product when the shaft 12 is idle. However, as shaft 12 spins up to speed, which may be about 100 rpm in one non-limiting embodiment, the pressure of sealing fluid 36 is decreased by pump 50 to operating pressure to counteract the pressure of the product liquid to force the lip seals 30 open to provide a very slow flow into the wind back section 44 which also pumps product fluid back into the vessel. The pressure supplied by pump 50 when the shaft 12 is rotating is less relative to when shaft 12 is idle because when idle, wind back section 44 is not operating.

Mechanical seal 22 and bushing 28 help keep sealing liquid 36 from escaping housing 14. Optionally, a second fluid seal or double seal 66 may be present along shaft 12 outward from liquid full pressurized vessel seal 10. Second fluid seal 66 has a sealing fluid chamber 68 bound by shaft 12 opposite bore 20, mechanical seal 22 on one end and another conventional mechanical seal 70 on the other end. Seal 70 likewise comprises a stator 72 and a rotor 74 which bear on each other. Sealing fluid 36 is supplied at relatively high pressure via second seal injection conduit 76.

The invention will now be discussed using some representative pressures that might be used with the seal 10 of the invention, but it will be appreciated that the pressures mentioned are merely exemplary and are not intended to limit the invention. For example in a commercial sized vessel processing thousands of pounds of polymer, such as SMA resin, the maximum relief pressure of the vessel might be 150 psig. and the vessel may have a normal operating pressure of about 100 psig. The relief valve 54 may thus be set at 135 psig., approximately 10% under the relief pressure of the vessel, in one aspect. As long as the normal operation pressure of the vessel is below the relief valve 54 setting, this valve will be closed. The normal operational pump setting could thus be about 500 cc of sealing fluid 36 injected per hour; relatively small. The pressure in injection conduit 34 would be the vessel operating pressure plus about 30 psi when shaft 12 is idle, less when shaft 12 is rotating. The gas above sealing fluid 36 in tank 60 may be at atmospheric pressure and the height of fluid 36, h, in tank may be about 6 inches. Main seal pressure supply line 62 may deliver sealing fluid 36 at a pressure of about 165 psig. If second fluid seal 66 is present, second seal injection conduit 76 would supply sealing fluid at that pressure to double seal 66.

Many modifications may be made in the vessel seal of this invention without departing from the spirit and scope thereof, which are defined only in the appended claims. For example, a particularly good sealing fluid or wind back thread design may be discovered which give particularly optimal results.

We claim:

1. A method for sealing a rotatable shaft within a stationary housing having a bore surrounding the shaft where the housing is integral with a vessel defining an interior space with a liquid full pressurized vessel seal associated, the vessel containing a viscous material under pressure, comprising the steps of: means providing a stationary bushing within the bore and turning the rotatable shaft within the bushing;

providing means for continuously, injecting a sealing fluid under pressure through the housing and the bushing onto the shaft at at least one injection point;

providing a viscous liquid within the vessel;

providing a sealing surface on the rotatable shaft located inward from the injection point toward the vessel;

providing a plurality of lip seals on the bore inward from the injection point toward the vessel, the lip seals being adjacent to and contacting the sealing surface; and continuously injecting a sealing fluid under pressure through the housing and the bushing onto the shaft at at least one injection point outward of the lip seals but inward of the bushing at a pressure greater than the pressure of the viscous material sufficient to force open the lip seals and continuously force sealing fluid past the lip seals.

2. The method of claim 1 where the sealing fluid is selected from the group consisting of mineral oil, silicone oil and a fluid compatible with a material within the interior space of the vessel.

3. The method of claim 1 where the sealing surface is a ceramic coating selected from the group consisting of alumina and chromium oxide.

4. The method of claim 1 where each lip seal has a thin ring lip angled toward the vessel.

5. The method of claim 1 further comprising pumping the viscous liquid into the vessel using at least one wind back thread angled to direct product into the vessel, where the wind back thread is on at least one of the rotatable shaft and the bore inward from the lip seals toward the vessel.

6. The method of claim 5 where a stationary tetrafluoroethylene bushing is present in the bore adjacent but not touching the wind back thread.

7. The method of claim 5 further injecting sealing fluid into a second liquid vessel seal outward from the bushing, the second liquid vessel seal comprising a sealing fluid chamber defined by the rotatable shaft, the bore and a mechanical seal on opposing ends, the sealing fluid chamber being filled with sealing fluid.

8. A liquid full pressurized vessel seal associated with a rotatable shaft and a stationary housing having a bore surrounding the shaft where the housing is integral with a vessel defining an interior space containing a viscous material under pressure, comprising:

a stationary bushing within the bore within which the rotatable shaft may turn;

means for continuously injecting a sealing fluid under pressure through the housing and the bushing onto the shaft at at least one injection point;

a sealing surface on the rotatable shaft located inward from the injection point toward the vessel; and a plurality of lip seals on the bore inward from the injection point toward the vessel, the lip seals being adjacent to and contacting the sealing surface, where the pressure of the sealing fluid is greater than the pressure of the viscous material to continuously force the sealing fluid past the lip seals.

9. The liquid full pressurized vessel seal of claim 1 where the sealing fluid is selected from the group consisting of mineral oil, silicone oil, and a fluid compatible with a material within the interior space of the vessel.

10. The liquid full pressurized vessel seal of claim 1 where the injection means meters the sealing fluid into the seal.

11. The liquid full pressurized vessel seal of claim 1 where the sealing surface is a ceramic coating.

12. The liquid full pressurized vessel seal of claim 11 where the ceramic coating is selected from the group consisting of alumina and chromium oxide.

13. The liquid full pressurized vessel seal of claim 1 where each lip seal has a thin ring lip angled toward the vessel.

14. The liquid full pressurized vessel seal of claim 1 where the seal additionally comprises at least one wind back thread angled to direct product into the vessel, where the wind back thread is on at least one of the rotatable shaft and the bore inward from the lip seals toward the vessel.

15. The liquid full pressurized vessel seal of claim 1 where a stationary tetrafluoroethylene bushing is present in the bore adjacent but not touching the wind back thread.

16. The liquid full pressurized vessel seal of claim 1 where at least one mechanical seal is present outward on the stationary housing along the shaft to prevent the sealing fluid from escaping the housing.

17. The liquid full pressurized vessel seal of claim 1 further comprising a second liquid vessel seal outward from the bushing, the second liquid vessel seal comprising a sealing fluid chamber defined by the rotatable shaft, the bore and a mechanical seal on opposing ends, the sealing fluid chamber being filled with sealing fluid.

18. A liquid full pressurized vessel seal associated with a rotatable shaft and a stationary housing having a bore surrounding the shaft where the housing is integral with a vessel defining an interior space containing a viscous material under pressure, comprising:
a stationary bushing within the bore within which the rotatable shaft may turn;
means for continuously injecting a sealing fluid under pressure through the housing and the bushing onto the shaft at at least one injection point;
a sealing surface on the rotatable shaft located inward from the injection point toward the vessel;
a plurality of lip seals on the bore inward from the injection point toward the vessel, the lip seals being adjacent to and contacting the sealing surface, each lip seal having a thin ring lip angled toward the vessel; and
at least one wind back thread angled to direct product into the vessel, where the wind back thread is on at least one of the rotatable shaft and the bore inward from the lip seals toward the vessel, where the pressure of the sealing fluid is greater than the pressure of the viscous material to continuously force the sealing fluid past the lip seals.

19. The liquid full pressurized vessel seal of claim 18 where the sealing fluid is selected from the group consisting of mineral oil, silicone oil, and a fluid compatible with a material within the interior space of the vessel.

20. The liquid full pressurized vessel seal of claim 18 where the injection means meters the sealing fluid into the seal.

21. The liquid full pressurized vessel seal of claim 18 where the sealing surface is a ceramic coating.

22. The liquid full pressurized vessel seal of claim 21 where the ceramic coating is selected from the group consisting of alumina and chromium oxide.

23. The liquid full pressurized vessel seal of claim 22 where a stationary tetrafluoroethylene bushing is present in the bore adjacent but not touching the wind back thread.

24. A liquid full pressurized vessel seal associated with a rotatable shaft and a stationary housing having a bore surrounding the shaft where the housing is integral with a vessel defining an interior space, comprising:
a stationary bushing within the bore within which the rotatable shaft may turn;
means for injecting mineral oil under pressure through the housing and the bushing onto the shaft at at least one injection point;
a sealing surface on the rotatable shaft located inward from the injection point toward the vessel;
a chromium oxide ceramic coating on the sealing surface;
a plurality of lip seals on the bore inward from the injection point toward the vessel, the lip seals being adjacent to and contacting the sealing surface, each lip seal having a thin ring lip angled toward the vessel;
at least one wind back thread angled to direct product into the vessel, where the wind back thread is on at least one of the rotatable shaft and the bore inward from the lip seals toward the vessel;
a stationary tetrafluoroethylene bushing in the bore adjacent but not touching the wind back thread; and
a sealing fluid supply system for providing sealing fluid to the injecting means at a pressure sufficient to force open the lip seals when the vessel is filled with a viscous liquid under pressure.

* * * * *